June 6, 1972    J. C. ABROMAVAGE ET AL    3,667,780
BUMPER HITCH ASSEMBLY TENSION EQUALIZER
Filed March 30, 1971    3 Sheets-Sheet 1

INVENTORS
JOHN C. ABROMAVAGE
JAMES RYDEN

BY David K. Semmes
ATTORNEYS

June 6, 1972   J. C. ABROMAVAGE ET AL   3,667,780
BUMPER HITCH ASSEMBLY TENSION EQUALIZER
Filed March 30, 1971   3 Sheets-Sheet 2
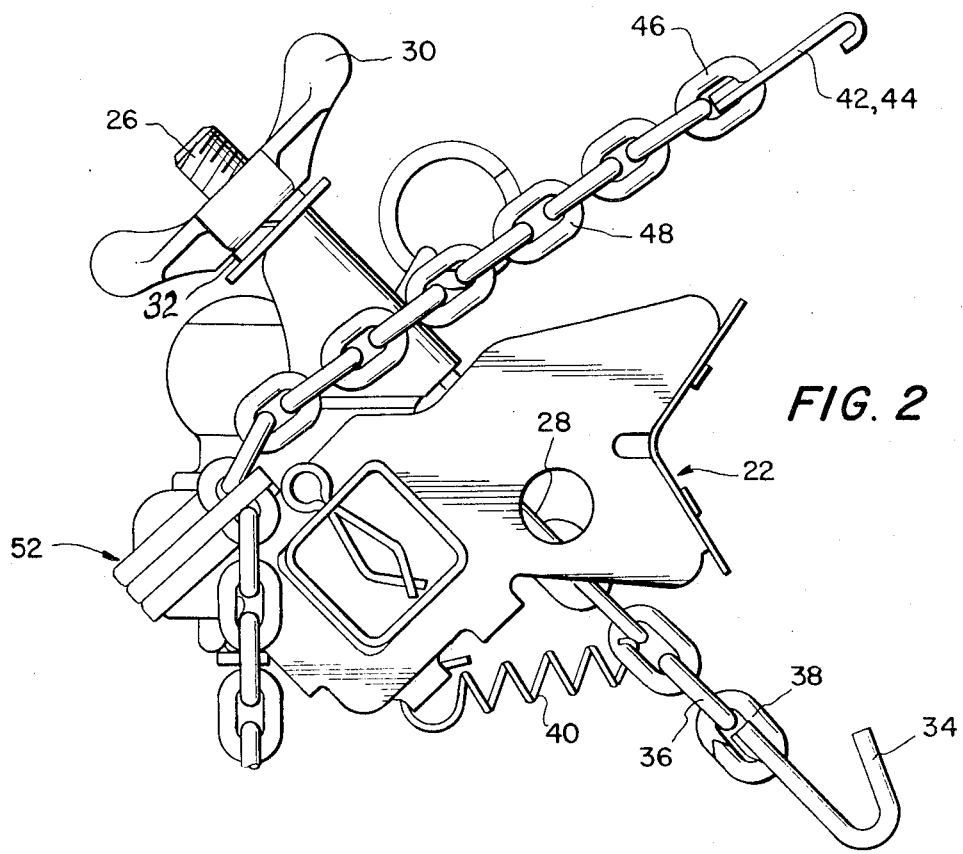
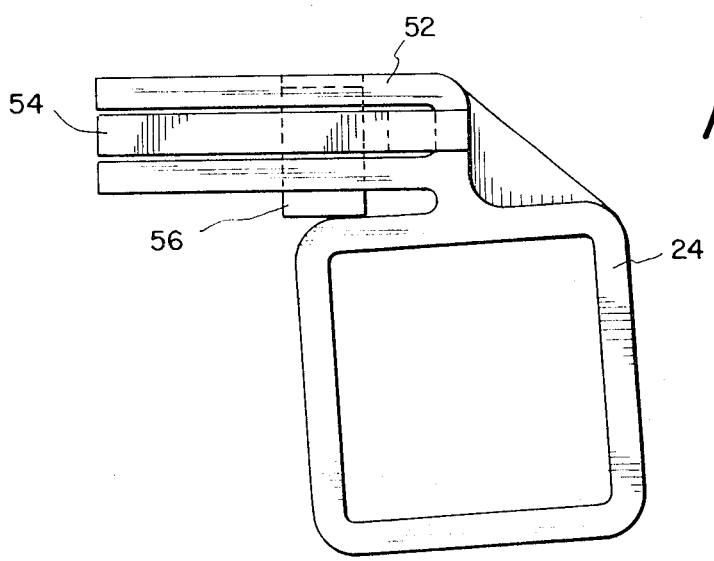
INVENTORS
JOHN C. ABROMAVAGE
JAMES RYDEN
BY David H. Semmes
ATTORNEYS June 6, 1972   J. C. ABROMAVAGE ET AL   3,667,780
BUMPER HITCH ASSEMBLY TENSION EQUALIZER
Filed March 30, 1971                        3 Sheets-Sheet 3

INVENTORS
JOHN C. ABROMAVAGE
JAMES RYDEN

BY *David K. Semmes*

ATTORNEYS

# United States Patent Office 3,667,780
Patented June 6, 1972

3,667,780
BUMPER HITCH ASSEMBLY TENSION
EQUALIZER
John C. Abromavage, Tempe, and James W. Ryden,
Phoenix, Ariz., assignors to Advanced Management
Engineering & Research Company, Phoenix, Ariz.
Filed Mar. 30, 1971, Ser. No. 129,515
Int. Cl. B60d 1/14
U.S. Cl. 280—502
6 Claims

ABSTRACT OF THE DISCLOSURE

A bumper hitch assembly tension equalizer, particularly a temporary or "rental" hitch assembly which is easily fastenable to various types of automobile bumpers and particularly suited for use with bumpers that are not straight line. Such bumpers create a need for plural top hooks, two for each bumper attaching clamp, to compensate for bumper deviation from a straight line. In such a four hook hook-up, in the absence of equalizing means equal tension on all top hooks cannot be obtained. The equalizer of the present invention controls the tension on the safety chains and thereby on all top hooks using an equalizer bar pivotable about a point, and capable of shifting position to gain equal tension when a bottom attachment hook is tightened.

BACKGROUND OF THE INVENTION

The present invention is an improvement over the inventions described in Pat. No. 3,113,789, entitled Bumper Hitch Assembly, and 3,436,100, entitled Articulated Bumper Hitch, both assigned to a common assignee herewith.

Each of the aforesaid patents relate to bumper hitch assemblies for bumpers that are of straight line configuration. Such assemblies include a horizontal bar with a ball socket or like hitch positioned upon the bar and separate bumper clasping elements adjustably positioned upon the horizontal bar at either side of the hitch. The bumper clasping elements includes a housing, a separate bumper contact portion extending from the bar towards the bumper, a bumper top clasping chain and a bumper bottom clasping chain. The bumper bottom clasping chain is tightenable so as to secure the entire bumper hitch assembly to the automobile bumper. As applied to straight line bumpers these prior constructions were effective.

When applied to bumpers that are not straight line, however, it has been found that a need exists for four top hooks applied over the bumper, two for each bumper clasping element, for proper positional securement to the bumper. Each such hook necessitates attachment by means of tension chains and the problem exists of attempting to achieve equal tension on all top hooks. Other trailer hitch assemblies such as shown in Pat. Nos. 3,423,106; 3,481,630; and 3,547,470, have been devised for utilization with bumpers shown therein which are not straight line, but these constructions have not proven satisfactory in use for non straight line bumpers. The positional securement and fixation of the bumper hitch assembly for such straight line construction necessitates four top securement hooks instead of the two hooks, one for each bumper clasping element, as shown in the aforesaid patents.

The present invention overcomes these deficiencies of prior known constructions.

SUMMARY OF THE INVENTION

The present invention accordingly is for a bumper hitch assembly particularly suitable for use with bumpers not of straight line configuration, and in which the bumper clasping elements which are slidable upon a horizontal bar at either side of the ball hitch, or the like, are provided with two top hooks so that a total of four top hooks are used, and equalizer means in the nature of an equalizer bar is provided for coacting with the clasping chains to each of the hooks, and the equalizer bar is pivoted and shiftable in position in such a manner as to obtain equal tension, through said chains, on the four hook hook-up when a bottom tightening hook for each bumper clasping element is tightened.

Additional and further objects and advantages will be more readily apparent from the following detailed description of a preferred embodiment thereof when taken together with the accompanying drawings in which:

FIG. 2 is a side elevational view of a bumper clasping assembly element;

FIG. 5 is a side plan view of the equalizer bar.

Figure 1:
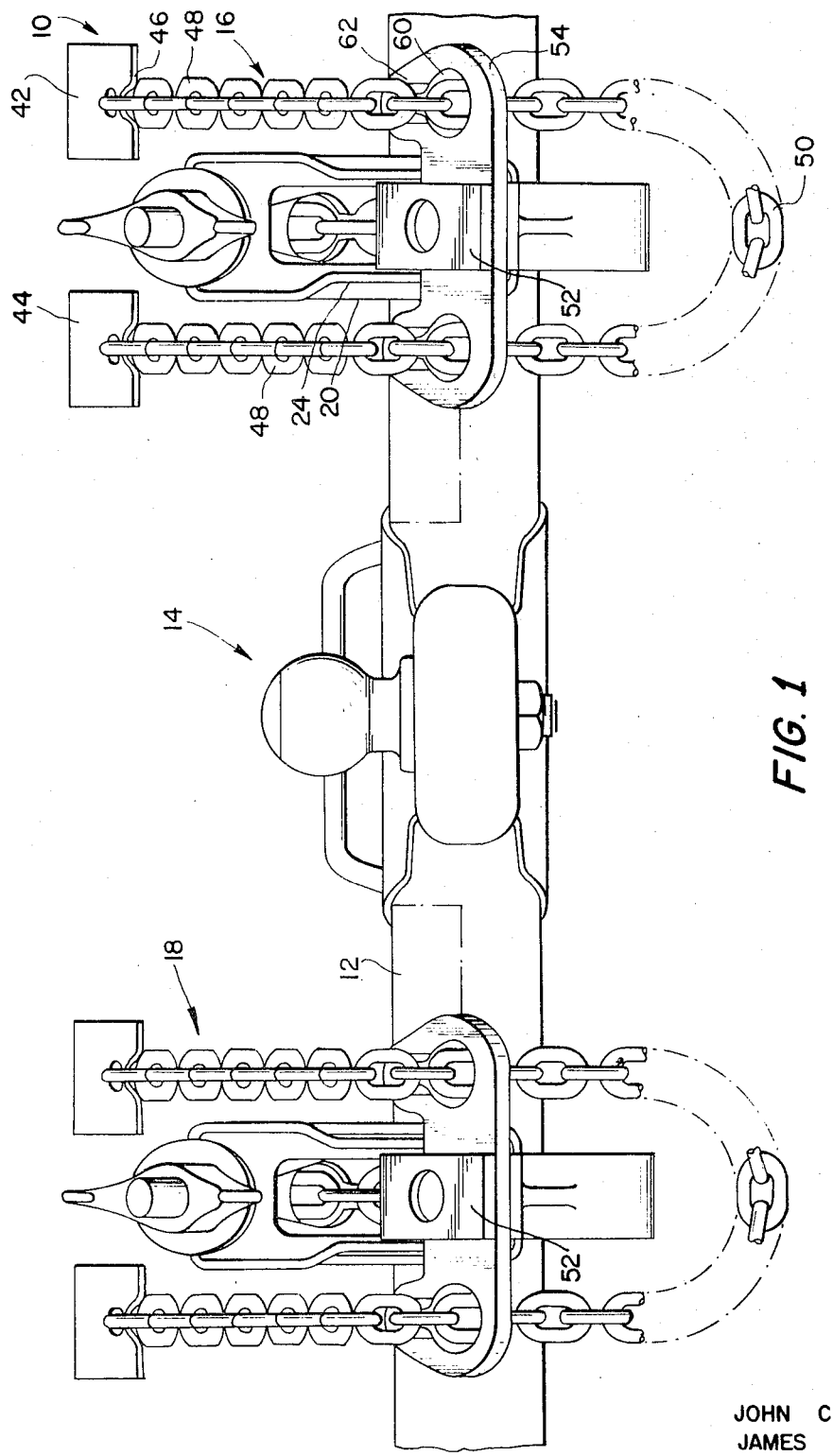
FIG. 1 is a front elevational view of a hitch assembly in accordance with the invention.

In FIG. 1, the bumper hitch assembly is adapted for attachment for a bumper of a configuration which is not straight line. The bumper hitch assembly includes a horizontal hitch bar 12 of a usual type of hollow square configuration set at an angle to enhance strength and force transmission with respect to the trailing vehicle. A ball socket assembly 14 is appropriately secured to hitch bar 12 in a usual manner. The assembly, as is usual, is provided with bumper clasping units 16 and 18 slidably mounted on hitch bar 12 on either side of the ball socket assembly 14. Each of the bumper clasping units includes a bumper abutting or outer portion which extends toward the bumper exposed surface, and preferably having a bumper abutting pad 22, and an inner housing 24 through which extends threaded bolt 26, all as shown in prior Pat. No. 3,436,100. At the lower end of bolt 26 an adjusting bolt lug plate 28 extends into outer portion 20. Both inner housing 24 and outer housing 20 encircle the hitch bar 12 independently. A wing nut 30 on bolt 26 is used as in previous constructions for tightening the assembly on the bumper and securement means, not shown, can be applied for securement upon wing nut adjustment. A lock spring 32 is also provided as shown in greater detail in FIG. 2.

A lower bumper hook 34 is attached to lower chain 36 by means of lower hook connector 38. Lower chain 36 extends through outer portion 20 and into a medial aperture or the like in lug plate 28. Lug plate 28 is actuatable towards and away from the bottom of the bumper by means of movement of wing nut 30 upon bolt 36. A tension connector 40 interconnects chain 36 and the bumper hitch assembly as shown in FIG. 2.

Figure 3:
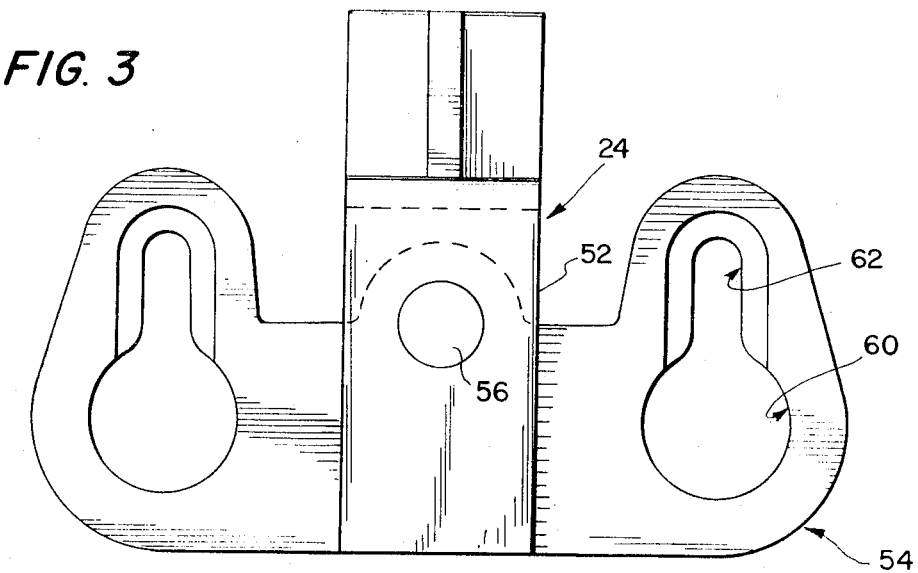
FIG. 3 is a top plan view of an equalizer bar of the invention.
Figure 4:
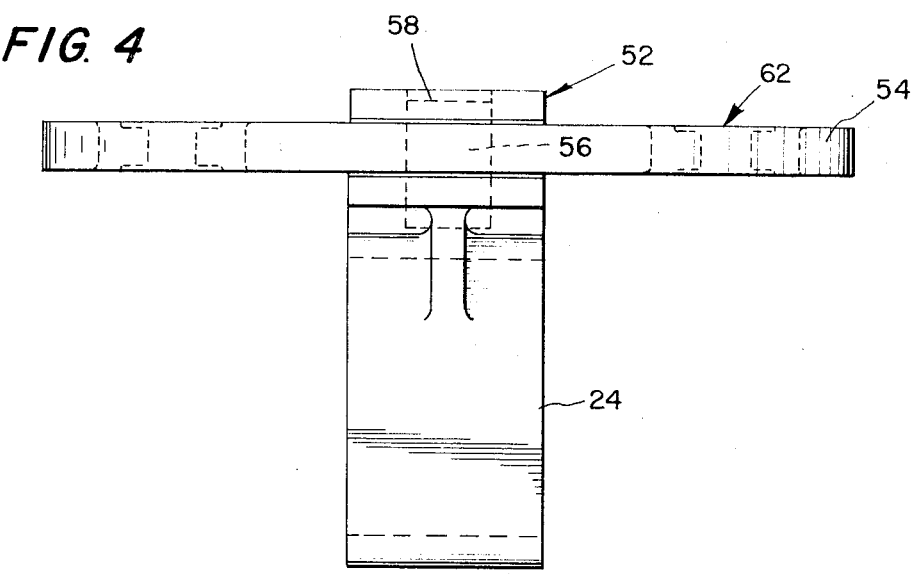
FIG. 4 is a rear plan view of the equalizer bar.

Of the essence of this invention is the provision in each of the bumper clasping units 16 and 18 of two top bumper hooks 42, 44 adapted for securement over a bumper top in a usual manner. Each of the top hooks is appropriately secured by attachment 46 to the upper ends of top bumper clasping chains 48 which depend downwardly toward and over the bumper clasping unit, and have their free ends connectable by means of a chain connector 50. In order to achieve equal tension on all top hooks, an equalizer assembly is provided. To this end, inner housing 24 constitutes a housing for the equalizer hitch and includes a bifurcated arm extension 52, FIGS. 3, 4, and 5 on which an equalizer arm 54 is pivotally mounted on pivot 56. In assembly the equalizer arm is placed in the bifurcation and the pivot pin 56 inserted and then welded as at 58. The so pivotally mounted equalizer arm extends laterally at opposed ends from the assembly, and has openings 60 through which chains 48 extend. The openings 60 terminate in chain clasping or securement notches 62. When mounting the hitch assembly on the bumper, the top hooks 42, 44 of each clasping unit 16, 18 are placed over the upper edge of the bumper with the chains 48 extending through openings 60, and appropriately secured in notches 62 which provide for half link length adjustment. The bottom hook 34 is placed over the bottom edge of the bumper and thereafter the bottom hook is tightened by manipulation of wing nut 30 to secure the bumper clasping unit on the bumper. During this operation, the equalizer bar 54 pivots about pivot 56, and due to its being shiftable in position will gain equal tension on all top hooks when the bottom hook is tightened. This arrangement overcomes the deficiencies when dealing with bumpers that are not straight line.

Manifestly changes in details of construction are possible without departing from the spirit and scope of the invention as defined in and limited solely by the appended claims.

We claim:
1. A bumper hitch assembly comprising:
   (a) a horizontal bar;
   (b) a hitch medially positioned upon said bar;
   (c) bumper clasping elements adjustably positioned upon said bar at either side of said hitch, said elements further including:
      (i) a housing extending about said bar;
      (ii) plural bumper clasping means extending from said housing to one edge of said bumper and oppositely spaced from the vertical medial line of said housing;
      (iii) bumper clasping means extending from said housing to the other edge of said bumper;
      (iv) means tightening said bumper clasping means to said other bumper edge;
      (v) tension equalizer arm pivotally mounted on said housing with said plural bumper clasping means being respectively adjustably secured spacedly to opposite end portions thereof, and adapted upon said tightening to pivot for achieving equal tension on said plural clasping means.

2. A bumper hitch assembly as claimed in claim 1, said plural bumper clasping means being two in number and extending from said housing to the top edge of said bumper and being laterally spacedly engaged therewith, the other said bumper clasping means extending from said housing to the bottom edge of said bumper and positionally attached thereto at a point substantially in line with said vertical medial line of said housing.

3. A bumper hitch assembly as claimed in claim 2, said bumper clasping means comprising bumper engaging hooks and interconnecting chains extending therefrom to said housing, said equalizer arm being centrally pivoted and having chain openings terminating in locking means therethrough, with said chains from said plural bumper clasping means extending through and locked in said openings and locking means.

4. A bumper hitch assembly as claimed in claim 3, said housing including an independent inner housing extending about said bar and an independent outer housing portion also extending about said bar, said tension equalizer arm being pivotally mounted on said inner housing and said chains from said plural bumper clasping means being adjustably lockable in said locking means at half link intervals of said chain for initial rough adjustment of positionment of the clasping elements and hitch with respect to said bumper.

5. A bumper hitch assembly as claimed in claim 4, and a lug plate adjustably mounted in said inner housing and connected to a threaded bolt means supported in said inner housing, the bottom chain engaging said lug plate and being tightened by adjustment of said threaded bolt means, said equalizer arm being shiftable upon tightening to impart the equal tension to all the top bumper engaging chains and interengaged hooks.

6. A bumper hitch assembly as claimed in claim 5, wherein for bumpers that are not straight line the assembly includes four upper bumper engaging hooks and two lower bumper engaging hooks, said equalizer bar upon tightening pivoting about a point to shift its position to gain equal tension on all the upper hooks when the bottom hook is tightened.

References Cited
UNITED STATES PATENTS

| | | | |
|---|---|---|---|
| 2,791,445 | 5/1957 | Wanamaker | 280—502 |
| 3,113,789 | 12/1963 | Safford | 280—502 |
| 3,233,917 | 2/1966 | Lindsey | 280—502 |
| 3,423,106 | 1/1969 | Parkhurst | 280—502 |
| 3,436,100 | 4/1969 | Abromavage | 280—502 |
| 3,547,470 | 12/1970 | Parkhurst | 280—502 |

BENJAMIN HERSH, Primary Examiner

R. R. SONG, Assistant Examiner